United States Patent
Zhang

(10) Patent No.: US 12,026,514 B1
(45) Date of Patent: Jul. 2, 2024

(54) BUS-INTERLEAVE PROTOCOL TO IMPROVE MULTIPLE LOGIC UNIT (LUN) OPERATION EFFICIENCY

(71) Applicant: Yangtze Memory Technologies Co., Ltd., Hubei (CN)

(72) Inventor: Huangpeng Zhang, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/148,214

(22) Filed: Dec. 29, 2022

(30) Foreign Application Priority Data

Dec. 22, 2022 (CN) .......................... 202211659068.1

(51) Int. Cl.
*G06F 9/30* (2018.01)

(52) U.S. Cl.
CPC ........ *G06F 9/3013* (2013.01); *G06F 9/30134* (2013.01)

(58) Field of Classification Search
None
See application file for complete search history.

(56) References Cited

U.S. PATENT DOCUMENTS 11,892,902 B2 * 2/2024 Liu ........................ G11C 15/00

* cited by examiner

*Primary Examiner* — Scott C Sun
(74) *Attorney, Agent, or Firm* — Sterne, Kessler, Goldstein & Fox P.L.L.C.

(57) ABSTRACT

Disclosed herein are memory device, method for managing a storage system. In an aspect, a memory device comprises an address register to store addresses and a processor coupled to the address register. The processor is configured to receive a first multi-plane program operation command of a set of multi-plane program operation commands. The processor is further configured to latch a first address of the first multi-plane program operation command into the address register. In addition, the processor is further configured to receive a read operation command that includes a second address and refrain from latching the second address into the address register.

20 Claims, 11 Drawing Sheets

BUS-INTERLEAVE PROTOCOL TO IMPROVE MULTIPLE LOGIC UNIT (LUN) OPERATION EFFICIENCY

TECHNICAL FIELD

This description relates to a memory device and method for multiple logic unit (LUN) operations. Specifically, the device and method improve the efficiency and reliability of the multiple LUN operations.

BACKGROUND

A flash memory chip can include one or more logic units (LUNs), each LUN corresponding to a physical component of the flash memory chip and each LUN can includes one or more planes. A plane contains a plurality of NAND cells, which are used to store data. In some aspects, the one or more LUNs share a memory interface, such as an I/O data interface. The one or more LUNs of the flash memory chip receive commands, addresses, and data via the memory interface. The one or more LUNs of the flash memory chip can also transmit data via the memory interface. In some aspects, a LUN is also referred to as a die.

In some aspects, the one or more LUNs includes a first LUN and a second LUN. The one or more LUNs can perform a multi-plane operation, such as a multi-plane program operation. For example, the first LUN can be configured to program a plurality of planes based on a plurality of program operation commands, each of which includes commands, an address, and data. In some aspects, the first LUN receives the plurality of the program operation commands consecutively. Because the first LUN and the second LUN share the memory interface, the first LUN can also receive operation commands of the second LUN, such as a read operation command. In some aspects, the first LUN can receive the read operation command after receiving a first program operation command (of the plurality of the program operation commands) and before receiving one or more other program operation commands of the plurality of the program operation commands. In such a case, address data stored in the address register of the first LUN becomes corrupted.

SUMMARY

Some aspects of this disclosure relate to memory devices and methods for multiple logic unit (LUN) operations to avoid LUN address register corruption. For example, memory devices and methods are provided for improving the efficiency and reliability of the multiple LUN operations.

Some aspects of this disclosure provide a flash memory chip that includes one or more LUNs, each of which includes one or more planes. For example, the flash memory chip can include a first LUN and a second LUN. In some aspects, a LUN is also referred to as a die. The first LUN can include four planes. In some aspects, the first LUN and the second LUN share a data bus or a memory interface, such as an I/O data interface and/or a high-speed I/O bus. For example, the first LUN and the second LUN receive and transmit data via the data bus. Therefore, the first LUN receives not only data corresponding to the first LUN, but also data corresponding to the second LUN.

In some aspects, the first LUN can receive commands, addresses, and data via the data bus. For example, the first LUN can receive a program operation command that includes commands, a program address, and data to be written. The first LUN can latch the program address into an address register of the first LUN and write the data into cells corresponding to the program address. On the other hand, the program address can correspond to the second LUN. In such a case, the program address does not match any cells of the first LUN and the program operation command is terminated. For another example, the first LUN can receive a read operation command that includes commands and a read address. The first LUN can latch the read address into the address register of the first LUN and extract data from cells corresponding to the read address. On the other hand, the read address can correspond to the second LUN. In such a case, the read address does not match any cells of the first LUN and the read operation command is terminated.

In some aspects, the first LUN can receive a set of multi-plane program operation commands. For example, the set of multi-plane program operation commands can include a first and a second multi-plane program operation commands that include a first address and a second address, respectively. The first LUN can latch the first address into a first portion of the address register and latch the second address into a second portion of the address register consecutively. The first LUN then writes data into cells corresponding to the first address and second address.

In some aspects, the first LUN can receive a read operation command after receiving the first multi-plane program operation command and before receiving the second multi-plane program operation command. In such a case, the first LUN can latch the first address of the first multi-plane program operation command, the address of the read operation command, and the second address of the second multi-plane program operation command into a first, a second, and a third portions of the address register respectively. In some aspects, the read operation command corresponds to the second LUN. The first and the second multi-plane program operation commands correspond to the first LUN. In such a case, the address register contains addresses of both the first LUN and the second LUN. For example, the first LUN can determine that the address of the read operation command stored in the second portion of the address register does not match any cells of the first LUN and thus the address register is corrupted. In some aspects, the first LUN can discard the addresses stored in the address register and abandon the first and the second multi-plane program operation commands and the read operation command.

In some aspects, to avoid the situations described above, the first LUN can protect the address register by avoiding latching addresses corresponding to the second LUN into the address register. For example, the first LUN can enter a pending status after receiving the first multi-plane program operation command. The pending status can indicate that the first LUN has initiated a multi-plane program process and expects to receive additional multi-plane program operation commands. The first LUN can determine the pending status by receiving a multi-plane program operation command that includes a pending multi-plane command, such as a command 11h. While in the pending status, the first LUN can ignore operation commands other than multi-plane program operation commands. For example, the first LUN can receive the read operation command corresponding to the second LUN while in the pending status. The first LUN can determine that the read operation command is not a multi-plane program operation command and refrain from latching the address of the read operation command into the address register. In this way, the address register is protected and the first LUN is configured to latches addresses of multi-plane program operation commands into the address register while in the pending status.

In some aspects, the first LUN can exit the pending status and enter a standby status. For example, the first LUN can receive a multi-plane program operation command that includes a completion multi-plane command, such as a command 10h. The completion multi-plane command indicates that the multi-plane program operation command received is the last multi-plane program operation command of a set of multi-plane program operation commands. Therefore, by receiving the last multi-plane program operation command, the first LUN receives all multi-plane program operation commands of the set of multi-plane program operation commands. The first LUN can latch addresses of other operation commands received while in the standby status. For example, the first LUN can receive a read operation command in the standby status. In such a case, the first LUN process the read operation command and latches an address of the read operation command into the address register.

In some aspects, as described in more details below, the first LUN latches addresses using an address entry and an address counter of the first LUN. For example, the first LUN receives a multi-plane program operation command that includes a program command, such as a command 80h. The program command triggers the address entry to send an enabling signal to the address counter of the first LUN, wherein the enabling signal enables one or more shift registers of the address counter. The first LUN then latches the address of the received multi-plane program operation command based on statuses of the one or more shift registers of the address counter.

On the other hand, if the first LUN is in the pending status, the address entry determines whether or not to send the enabling signal to the address counter based on received operation commands. For example, if the first LUN receives a read operation command, the address entry can refrain from sending the enabling signal to the address counter. In such a case, the first LUN refrains from latching an address of the received read operation command because the one or more shift registers are not enabled.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

Figure 1:
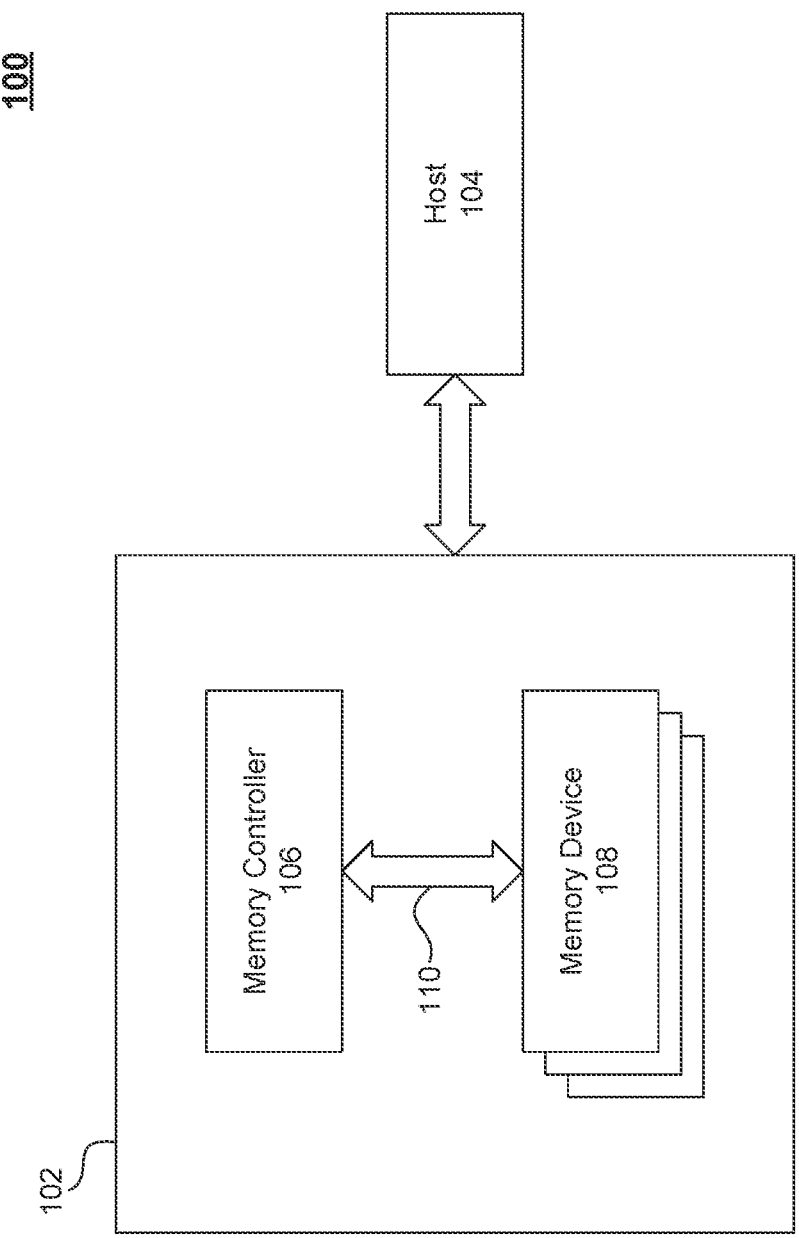
FIG. 1 illustrates an example memory system including a memory device, according to aspects of the present disclosure.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to affect such feature, structure, or characteristic in connection with other embodiments whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

FIG. 1 illustrates an example system 100, according to some aspects of the present disclosure. The system 100 can include, but is not limited to, wireless communication devices, smartphones, laptops, desktops, tablets, personal assistant devices, monitors, televisions, wearable devices, Internet of Things (IoT) devices, vehicle communication devices, and the like. The system 100 includes a memory system 102 and a host 104. In some aspects, the memory system 102 can also be referred to as a solid state drive (SSD), which includes a memory device 108 and a memory controller 106. The one or more memory devices can communicate with the host 104 through the memory controller 106, where the memory controller 106 can be connected to the memory device 108 via a memory channel 110. In some aspects, the memory system 102 can have more than one memory devices 108, while each memory device 108 can be managed by the memory controller 106. In some aspects, the memory controller 106 includes one or more processors.

The host 104 sends data to be stored at the memory system 102 or retrieves data by reading the memory system 102. The memory controller 106 can handle I/O requests received from the host 104, ensure data integrity and efficient storage, and manage the memory device 108. The memory channel 110 can provide data and control communications between the memory controller 106 and the one or more memory devices 108 via a data bus.

The memory device 108 (i.e., "flash," "NAND flash" or "NAND") can be a memory chip (package), a memory die or any portion of a memory die, and can include one or more memory planes, each of which can include a plurality of memory blocks. Identical and concurrent operations can take place at each memory plane. The memory block, which can be megabytes (MB) in size, is the smallest size to carry out erase operations. In some aspects, the memory device 108 includes four memory planes and each memory plane includes six memory blocks. Each memory block can include a plurality of memory cells, where each memory cell can be addressed through interconnections such as bit lines and word lines. The bit lines and word lines can be laid out perpendicularly (e.g., in rows and columns, respectively), forming an array of metal lines. In this disclosure, the memory block is also referred to as the "memory array" or "array." The memory array is the core area in a memory device, performing storage functions.

Figure 2:
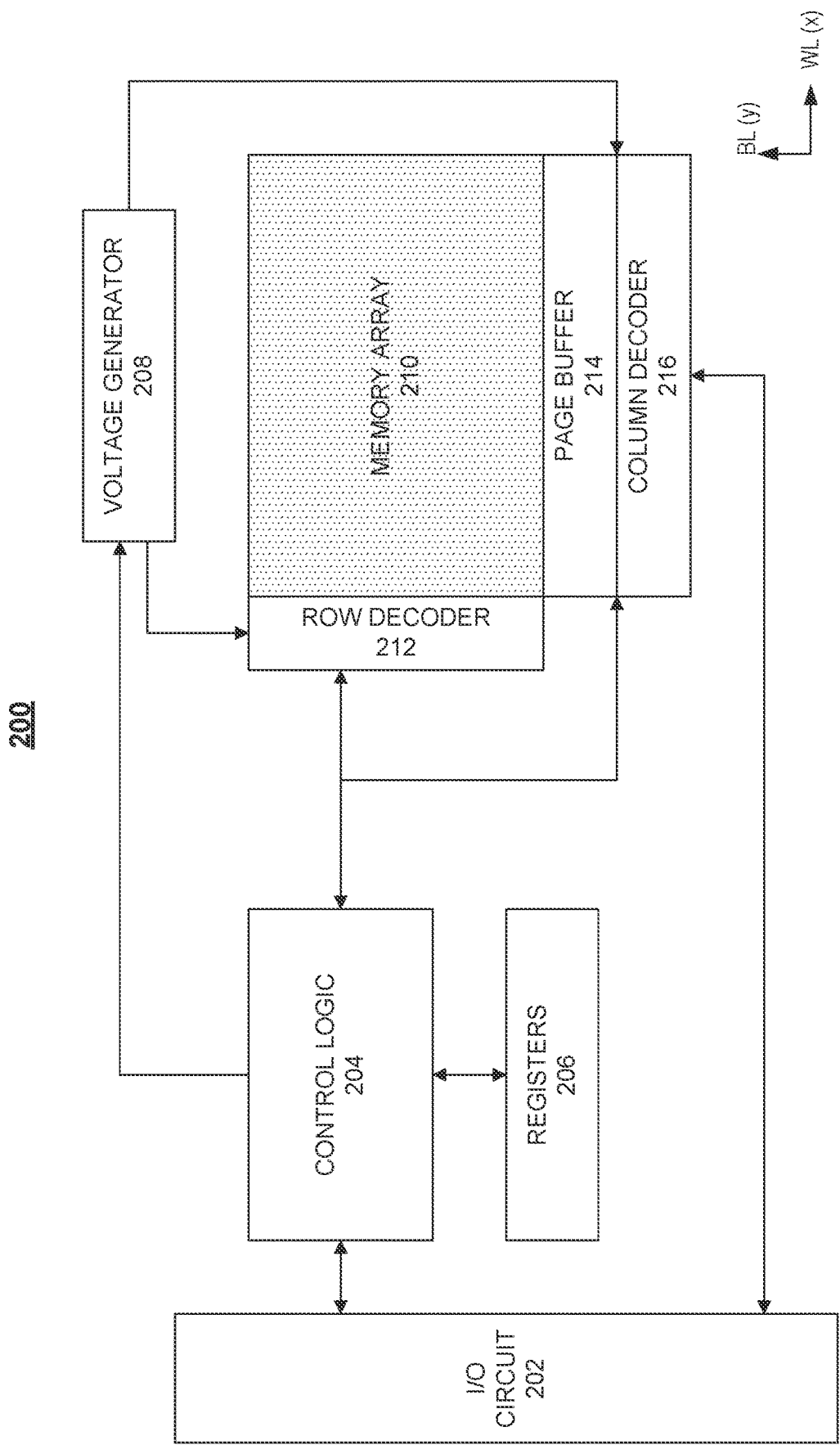
FIG. 2 illustrates an example block diagram of a memory device, according to aspects of the present disclosure.

FIG. 2 illustrates an example block diagram of a memory device 200, according to aspects of the present disclosure. In some aspects, the memory device 200 can be an example of the memory device 108 of FIG. 1. As shown in FIG. 2, the memory device 200 includes digital, analog, and/or mixed-signal circuits to support functions of a memory array 210, for example, row decoders 212, page buffers 214, and column decoders 216. The memory device 200 can also include I/O circuit 202, a control logic 204, a register 206, and a voltage generator 208. The control logic 204 can be configured to control other components of the memory device 200. For example, the control logic 204 can control the voltage generator 208, which generates voltages to be applied to memory cells of the memory array 210. The registers 206 can be coupled to the control logic 204 and include registration information, such as address data. In some aspects, the memory device 200 can communicate with a host, such as the host 104 of FIG. 1 via the I/O circuit 202. For example, the memory device 200 can receive commands from the host via the I/O circuit 202 and/or transmit data retrieved from the memory array 210 to the host.

It is noted that the layout of the electronic components in the memory system 102 of FIG. 1 and the memory device 200 of FIG. 2 are shown as an example. The memory system 102 and the memory device 200 can have other layouts and can include additional components.

Figure 11:
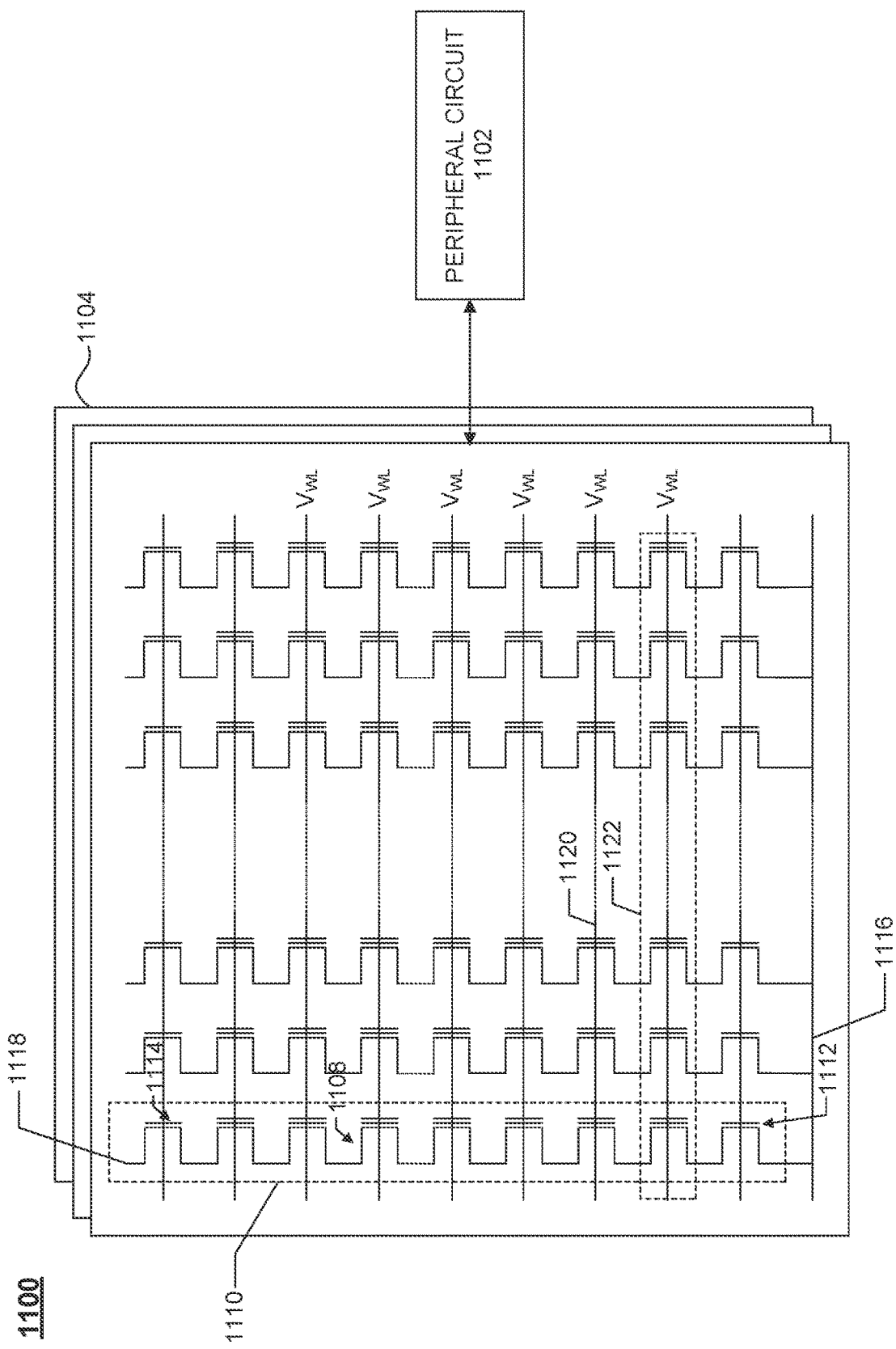
FIG. 11 illustrates an example schematic circuit diagram of a memory device, according to aspects of the present disclosure.

FIG. 11 illustrates an example schematic circuit diagram 1100 of a memory device, according to aspects of the present disclosure. The example schematic circuit diagram 1100 includes a memory cell array 1104 and a peripheral circuit 1102. In some aspects, the example schematic circuit diagram 1100 includes a plurality of memory strings 1110, each memory string 1110 having a plurality of memory cells 1108. The memory string 1110 also includes at least one field effect transistor (e.g., MOSFET) at each end, which is controlled by a lower select gate (LSG) 1112 and a top select gate (TSG) 1114, respectively. The memory cell 1108 can be controlled by a control gate, where the control gate can be connected to a word line 1120 of the example schematic circuit diagram 1100. The drain terminal of the TSG 1114 can be connected to the bit line 1118, and the source terminal of the LSG 1112 can be connected to an array common source (ACS) 1116. The ACS 1116 can be shared by the memory strings 1110 in an entire memory block, and is also referred to as the common source line.

In some aspects, the example schematic circuit diagram 1100 can be formed based on the floating gate technology. In some aspects, the example schematic circuit diagram 1100 can be formed based on charge trapping technology. The NAND flash memory based on charge trapping can provide high storage density and high intrinsic reliability. Storage data or logic states (e.g., threshold voltage Vth of the memory cell 1108) depends on the amount of charge trapped in a storage layer. In some aspects, the memory array 210 can be a three-dimensional (3D) memory device, and the example schematic circuit diagram 1100 can be a 3D memory array, where the memory cells 1108 can be vertically stacked on top of each other.

In a NAND flash memory, read and write operations can be performed in a memory page 1122, which includes all memory cells 1108 sharing the same word line. In a NAND memory, the memory cell 1108 can be in an erase state ER or a programmed state P1. Initially, all memory cells 1108 in the example schematic circuit diagram 1100 can be reset to the erase state ER as logic "1" by implementing a negative voltage difference between control gates and source terminals of the memory cells (e.g., the array common source 1116) such that all the trapped electronic charges in the storage layer of the memory cells 1108 can be removed. For example, the negative voltage difference can be induced by setting the control gates of the memory cells 1108 to ground, and applying a high positive voltage to the array common source 1116. At the erase state ER ("state ER"), the threshold voltage Vth of the memory cells 1108 can be reset to the lowest value, and can be measured or sensed at the bit line 1118.

During programming (i.e., writing), a programming voltage Vpgm (e.g., a positive voltage pulse between 10 V and 20 V) can be applied on the control gate such that electronic charges (e.g., electrons) can be injected into the storage layer of the memory cell 1108, and thereby increase the threshold voltage Vth of the memory cell 1108. Thus the memory cell 1108 is programmed to the state P1.

A NAND flash memory can be configured to operate in a single-level cell (SLC) mode. To increase storage capacity, a NAND flash memory can also be configured to operate in a multi-level cell (MLC) mode, a triple-level cell (TLC) mode, a quad-level cell (QLC) mode, or a combination of any of these modes. In the SLC mode, a memory cell stores "1" bit and has two logic states ("states"), i.e., states ER and P1. In the MLC mode, a memory cell stores 2 bits, and has four states, i.e., states ER, P1, P2, and P3. In the TLC mode, a memory cell stores 3 bits, and has eight states, i.e., states ER, and states P1-P7. In the QLC mode, a memory cell stores 4 bits and has 16 states.

Figure 3:
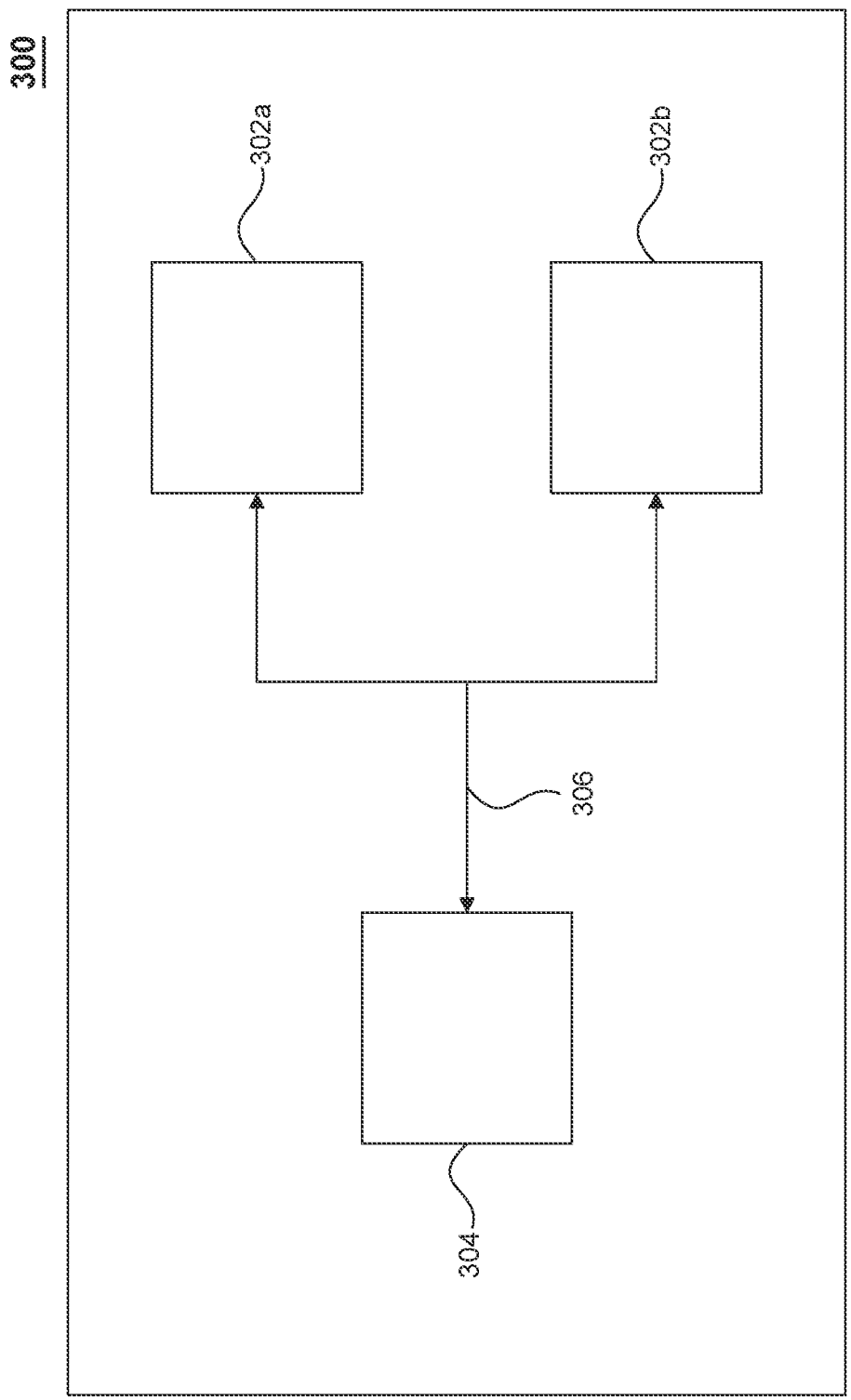
FIG. 3 illustrates an example system of the NAND flash memory, according to aspects of the present disclosure.

FIG. 3 illustrates an example memory system 300 comprising a NAND flash memory, according to aspects of the present disclosure. In some aspects, the example memory system 300 includes a first LUN 302a and a second LUN 302b. A LUN can also be referred to as a die. For example, the first LUN 302a and the second LUN 302b can also be referred to as a first die 302a and a second die 302b. In some aspects, each LUN of the example memory system 300, such as the first LUN 302a and the second LUN 302b, include one or more planes. The example memory system 300 also includes a chip controller 304, which includes one or more processors. In some aspects, the chip controller 304 can also be referred to as a memory controller of FIG. 1. The chip controller 304 communicates with the first LUN 302a and the second LUN 302b via a data bus 306. For example, the chip controller 304 can transmit a program operation command to the first LUN 302a via the data bus 306, wherein the program operation command include commands, such as a command 80h and a command 10h, data to be written in the first LUN 302a, and an address of the first LUN 302a. For another example, the chip controller 304 can transmit a read operation command to the first LUN 302a via the data bus 306, wherein the read operation command include commands, such as a command 00h and a command 30h, and an address of the first LUN 302a. In some aspects, the data bus 306 can be a memory interface, such as an I/O data interface, an I/O channel, and/or a high-speed I/O bus.

In some aspects, as shown in FIG. 3, the chip controller 304 communicates with both the first LUN 302a and the second LUN 302b via the data bus 306. Thus, the first LUN 302a and the second LUN 302b receive identical data via the data bus 306. For example, the second LUN 302b can receive the program operation command corresponding to the first LUN 302a and/or the read operation command corresponding to the first LUN 302a.

In some aspects, each LUN of the example memory system 300, such as the first LUN 302a and the second LUN 302b, also includes an address register and at least one page register. Addresses of received commands are latched into the address register when address latch is enabled. When an address latch enable (ALE) signal is at a high state, the addresses are latched into the address register on the rising edge of a write enable (WE #) signal. The page register stores temporary data that are to be read from or written into the memory device. For example, the first LUN 302a can include a first address register and a first page register. The first LUN 302a stores addresses of operation commands received, such as a read operation command and/or a program operation command in the address register. The first LUN 302a stores input data and output data in the first page register. For example, the first LUN 302a receives the program operation command that includes input data to be written. The first LUN 302a stores the input data in the first page register before writing to cells of the first LUN 302a. The first LUN 302a can also receive the read operation command and extract output data from cells of the first LUN 302a. The first LUN 302a stores the output data in the first page register before transmitting the output data.

In some aspects, each LUN of the example memory system 300, such as the first LUN 302a and the second LUN 302b, also includes an address entry and an address counter. The address entry can receive a command, such as 80h command included in a program operation command, and send an enabling signal to the address counter based on the command received. Upon receiving the enabling signal, the address counter can latch an address of the command operation command into the address register. For example, the first LUN 302a can include a first address entry and a first address counter. In some aspects, when the first LUN 302a receives an operation command, such as the program operation command and the read operation command, the first address entry can send an enabling signal to the first address counter to initiate latching addresses to the first address register.

Figure 4:
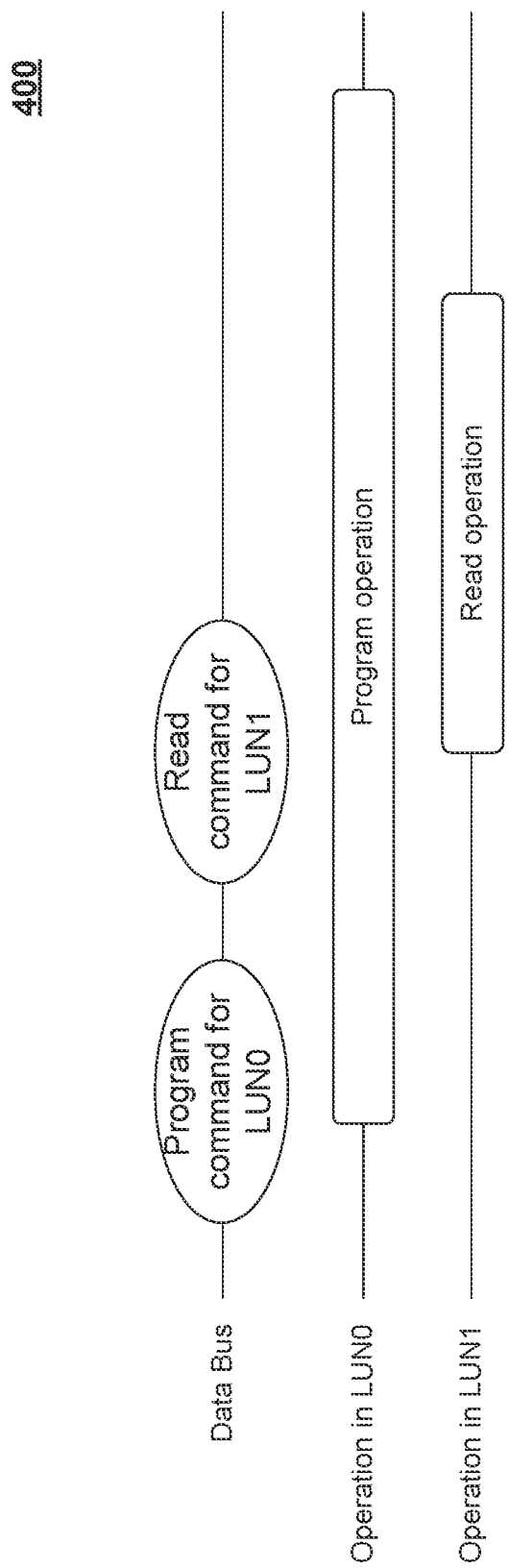
FIG. 4 illustrates an example of multiple logic unit (LUN) operations, according to aspects of the present disclosure.

FIG. 4 illustrates an example of multi-LUN operations 400, according to aspects of the present disclosure. As described above, the example memory system 300 can include a first LUN, such as a LUN0, and a second LUN, such as a LUN1, that both communicate with a chip controller, such as the chip controller 304, via a data bus, such as the data bus 306. Therefore, both the first and the second LUNs receive operation commands via the data bus. For example, the LUN0 receives a program operation command for the LUN0 via the data bus 306. The LUN0 then latches an address and input data to be written or programmed to the address register and the page register of the LUN0. Subsequently and with a time delay, the LUN0 starts a program operation based on the address and the input data. For example, LUN0 writes the input data into cells of LUN0 that corresponds to the address.

In some aspects, as shown in FIG. 4, a read operation command for the LUN1 is also transmitted on the data bus 306 after the transmission of the program operation command for the LUN0 and before a completion of the program operation of the LUN0. This is because that once the LUN0 latches the address and input data to be written or programmed, the data bus 306 becomes available for other transmissions, such as the transmission of the read operation command for LUN1. In this way, operations of the LUN1 is not delayed by operations of LUN0. For example, after LUN1 receives the read operation command and starts the read operation, both LUN0 and LUN1 operates simultaneously.

Figure 5:
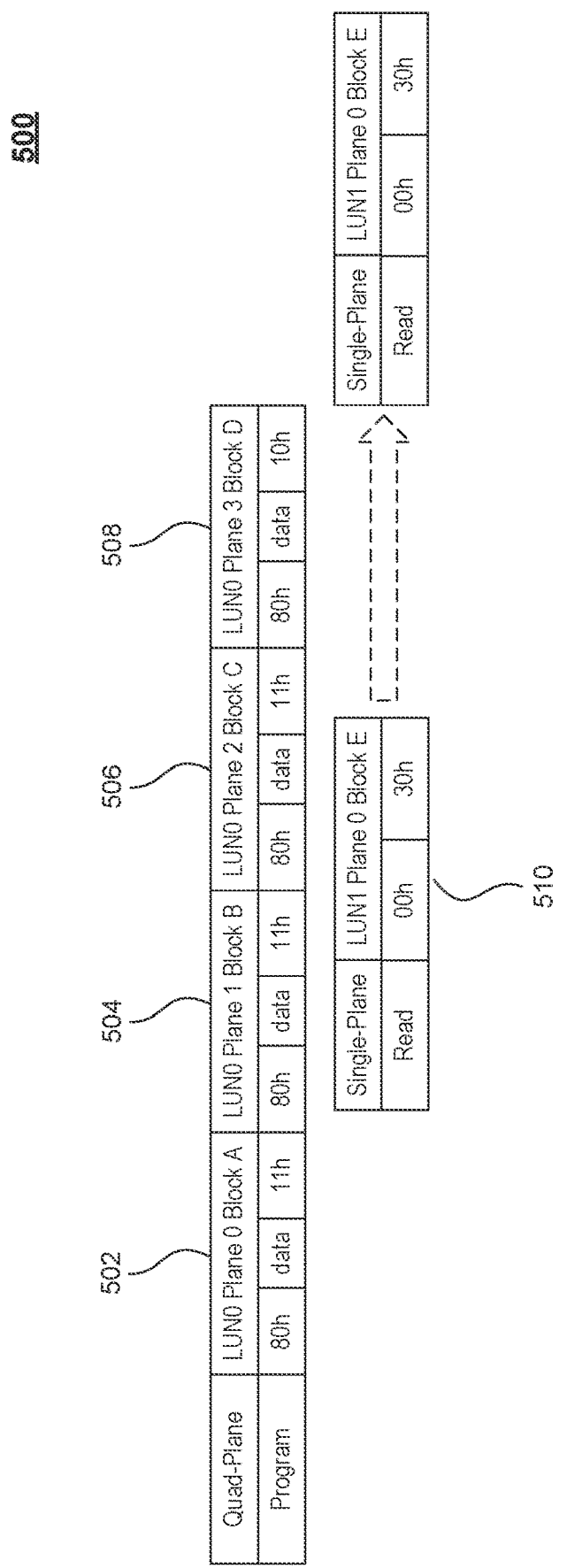
FIG. 5 illustrates an example of multi-LUN operation restrictions, according to aspects of the present disclosure.

FIG. 5 illustrates an example of multi-LUN operation restrictions 500, according to aspects of the present disclosure. In some aspects, LUN0 can receive a set of multi-plane program operation commands. For example, the set of multi-plane program operation commands can include a first multi-plane program operation command 502 corresponding to plane 0 of LUN0, a second multi-plane program operation command 504 corresponding to plane 1 of LUN0, a third multi-plane program operation command 506 corresponding to plane 2 of LUN0, and a fourth multi-plane program operation command 508 corresponding to plane 3 of LUN0, each of which configures the LUN0 to perform a multi-plane program operation.

In some aspects, each of the first, the second, and the third multi-plane program operation commands 502, 504, and 506 includes a command 80h, a command 11h, and data. Specifically, the command 80h initiates a multi-plane program operation; the data may include an address of the LUN0 and input data to be written; and the command 11h ends the multi-plane program operation. In some aspects, the command 11h also indicates that the instant multi-plane program operation command is not the last one of the set of multi-plane program operation commands and thus additional one or more multi-plane program operation commands are expected. On the other hand, the multi-plane program operation command 508 includes a command 10h instead of the command 11h. In some aspects, the command 10h ends a multi-plane program operation and also indicates that the instant multi-plane program operation command is the last one of the set of multi-plane program operation commands.

In some aspects, the chip controller 304 transmits the set of multi-plane program operation commands to the LUN0 continuously in time. If the chip controller 304 receives a read operation command 510 for the LUN1 before finishing the transmission of the set of multi-plane program operation commands to the LUN0, the chip controller 304 waits until the transmission of the set of multi-plane program operation commands to the LUN0 completes. In some aspects, a set of multi-plane program operation commands is relatively large in size compared with a read operation command and keeps the data bus 306 occupied in an extended duration.

In some aspects, the LUN0 can receive a set of single-plane program operation commands that is directed to a plane of the LUN0. The LUN0 may include the plane. Each of the single-plane program operation commands corresponds to a portion of the plane. In other aspects, the LUN0 may include one or more planes and the set of single-plan program operation commands is directed to one of the one or more planes. In such a case, each of the single-plane program operation commands corresponds to a portion of the one of one or more planes. In either aspects, the chip controller 304 transmits the set of single-plane program operation commands to the LUN0 continuously in time. If the chip controller 304 receives the read operation command 510 for the LUN1 before finishing the transmission of the set of multi-plane program operation commands to the LUN0, the chip controller 304 waits until the transmission of the set of single-plane program operation commands to the LUN0 completes.

Figure 6:
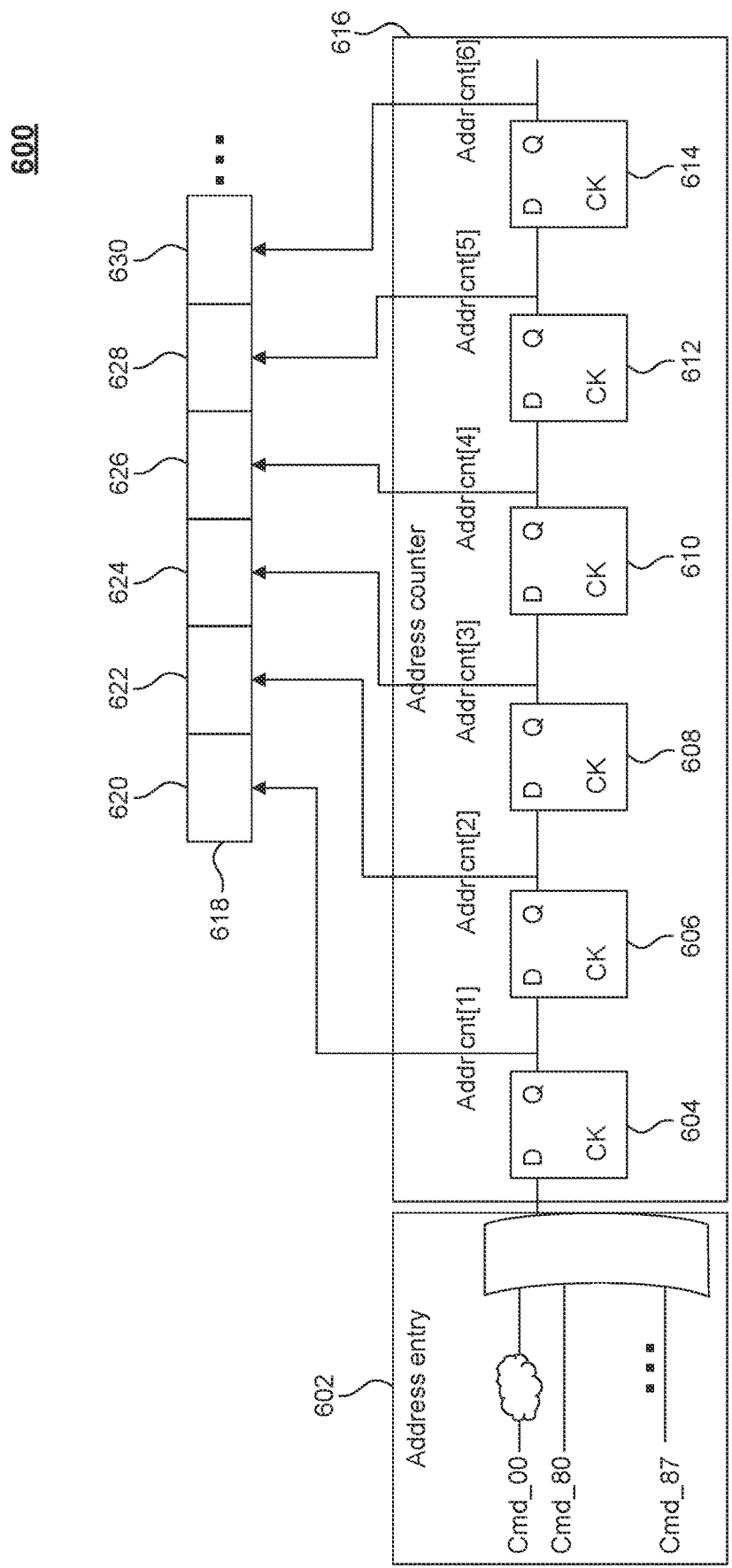
FIG. 6 illustrates an example system of the NAND flash memory that includes an address entry and an address counter, according to aspects of the present disclosure.

FIG. 6 illustrates an example system of the NAND flash memory that includes an address entry and an address counter, according to aspects of the present disclosure. As mentioned above, each LUN of the example memory system 300 may include an address entry 602, an address counter 616, and an address register 618, which may be collectively referred to as an address register. In some aspects, the address counter 616 includes one or more shift registers. For example, the address counter 616 can include shift registers 604, 606, 608, 610, 612, and 614. In some aspects, the address counter 616 can have a different number of shift registers and the number of shift registers are predefined. Each of the shift registers corresponds to a chunk of the address register 618. For example, the shift register 604 corresponds to a chunk 620, the shift register 606 corresponds to a chunk 622, and so on. In some aspects, chunks of the address register 618, such as chunks 620, 622, 624, 626, 628, and 630, has a predefined size. For example, each chunk can have a size of 8 bits. In such a case, the address counter 616 having six shift registers corresponds to 48 bits of the address register 618.

In some aspects, the address entry 602 sends an enabling signal to the address counter 616 based on received commands, such as commands 00h, 80h, and 87h. For example, when the address entry 602 receives a command 00h of a read operation command, the address entry 602 sends an enabling signal to the shift register 604 of the address counter 616 in a first cycle. In some aspects, the shift register 604 can be a flip-flop, such as a D flip-flop. A value of the shift register 604 changes from "0" to "1" when receiving the enabling signal in the first cycle. The address register 618, observing that the value of the shift register 604 becomes "1," latches one or more bits, such as 8 bits, of address data into the chunk 620 of the address register 618. Similarly, in a second cycle, the shift register 604 passes the enabling signal to the shift register 606. Thus, the value of the shift register 604 becomes "0" and a value of the shift register 606 becomes "1." The address register 618, observing that the value of the shift register 606 becomes "1," latches one or more bits, such as 8 bits, of the address data into the chunk 622 of the address register 618. In some aspects, the one or more bits latched in the second cycle follow the one or more bits latched in the first cycle in the address data. In this way, the address register 618 latches address data into the chunks 620, 622, 624, 626, 628, and 630 in six cycles. In some aspects, each of the six cycles are performed in a clock pulse period controlled by a system clock. The number of cycles required for latching the address data depends the number of shift registers, which is predefined. Here, the number of cycles required is six because the number of registers is six. The address data can include column address and row address. The bits latched into and stored in the chunks 620 and 622 can be the column address and the bits latched into and stored in the chunks 624, 626, 628, and 630 can be the row address. In other words, the shift registers 604 and 606 and the chunks 620 and 622 correspond to columns address data. The shift registers 608, 610, 612, and 614 and the chunks 624, 626, 628, and 630 correspond to row address data. This mapping can be different. For example, the bits latched into and stored in the chunks 620, 622, 624, and 626 can be the row address and the bits latched into and stored in the chunks 628 and 630 can be the column address. In some aspects, the address counter can have 5 shift registers, such as the shift register 604, 606, 608, 610, and 612. The address register can have 5 chunks, such as the chunks 620, 622, 624, 626, and 628. In such a case, 5 cycles are required to latch address data into the address register. The first two chunks, such as the chunks 620 and 622 can correspond to the column address and the last three chunks, such as the chunks 624, 626, and 628 can correspond to the row address.

In some aspects, the address entry 602 can receive a command 87h, which is a part of a block erase operation command. Because a block erase operation requires a row address, the block erase operation command can include row address data. In such a case, the address entry 602 can send the enabling signal to the shift register 608 directly in a first cycle. In some aspects, the address entry 602 connects to the shift register 608 directly. The address register 618, observing that the value of the shift register 608 becomes "1," latches one or more bits, such as 8 bits, of the row address data into the chunk 624 of the address register 618. In this way, address register 618 latches the row address data into the chunks 624, 626 628, and 630 in four cycles.

Figure 7:
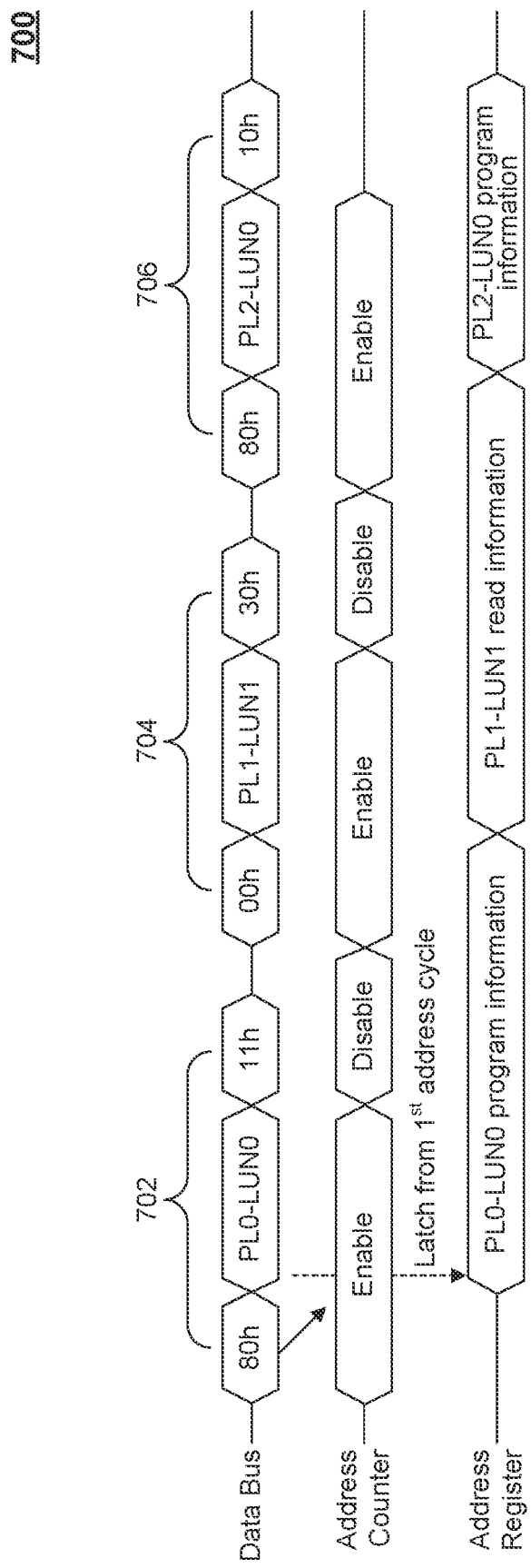
FIG. 7 illustrates an example timing diagram of the multi-LUN operations without address protections, according to aspects of the present disclosure.

FIG. 7 illustrates an example timing diagram of the multi-LUN operations without address protections, according to aspects of the present disclosure. As discussed above, the LUN0 and the LUN1 connect with a data bus, such as the data bus 306 of FIG. 3. Thus, the LUN0 and the LUN1 both receive operation commands via the data bus 306. As shown in FIG. 7, operation commands transmitted on the data bus include a multi-plane program operation command 702 corresponding to plane 0 of the LUN0, a read operation command 704 corresponding to plane 1 of the LUN1, and a multi-plane program operation command 706 corresponding to plane 2 of the LUN0. Therefore, the LUN0 and the LUN1 both receive the multi-plane program operation command 702, the read operation command 704, and the multi-plane program operation command 706. With respect to the LUN0, after receiving the multi-plane program operation command 702, an address entry, such as the address entry 602 of FIG. 6, of the LUN0 determines that the multi-plane program operation command 702 includes a command 80$h$ and sends an enabling signal to an address counter, such as the address counter 616, of the LUN0. The address counter of the LUN0 is then enabled and the LUN0 latches program information of plane 0 of LUN0, which includes address data of the multi-plane program operation command 702, into an address register, such as the address register 618, of the LUN0 as discussed above.

In some aspects, after receiving the read operation command 704, the address entry of the LUN0 similarly latches read information of plane 1 of LUN1, which includes address data of the read operation command 704, into the address register of the LUN0. In addition, after receiving the multi-plane program operation command 706, the address entry of the LUN0 similarly latches program information of plane 2 of LUN0, which includes address data of the multi-plane program operation command 706, into the address register of the LUN0. In such a case, information stored in the address register is corrupted because the data address of the LUN1, such as the address data of the read operation command 704 is stored in the address register. In some aspects, the multi-plane program operation command 706 may include program information of other planes of LUN0. For example, the multi-plane program operation command 706 can include program information of plane 3 or plane 4 of LUN0.

Figure 8:
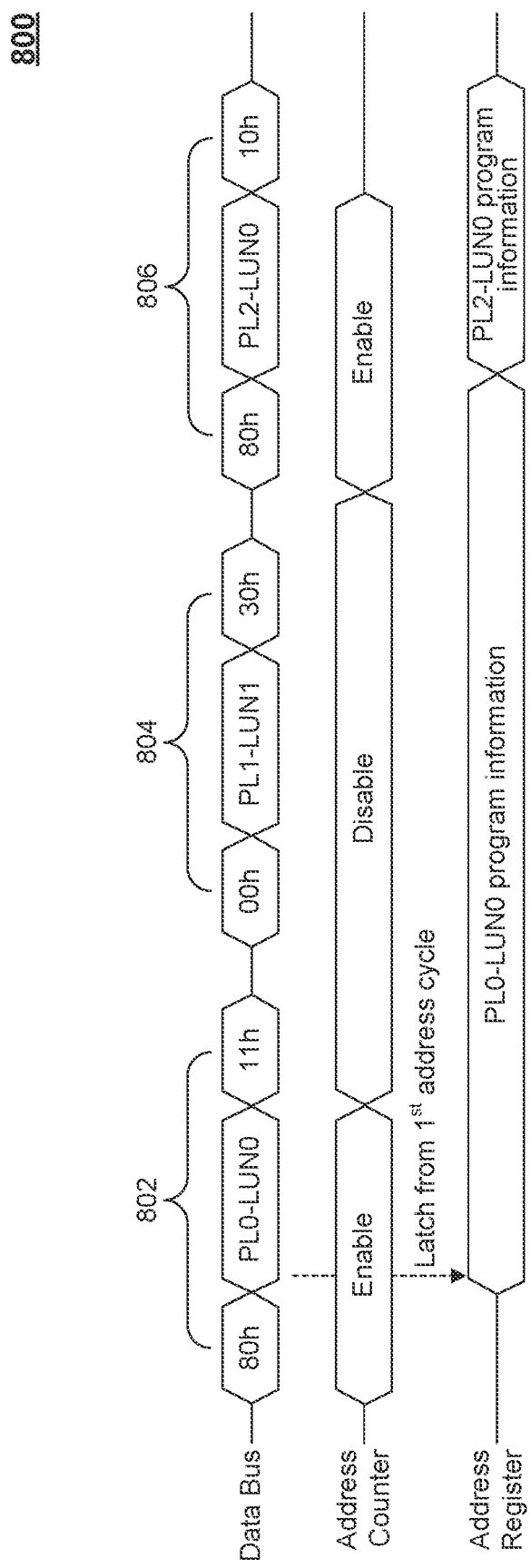
FIG. 8 illustrates an example timing diagram of the multi-LUN operations with the address protections, according to aspects of the present disclosure.

FIG. 8 illustrates an example timing diagram of the multi-LUN operations with address protections, according to aspects of the present disclosure. Similar to the discussion of FIG. 7, the LUN0 and the LUN1 connect with a data bus, such as the data bus 306 of FIG. 3. Thus, the LUN0 and the LUN1 both receive operation commands via the data bus. As shown in FIG. 8, operation commands transmitted on the data bus include a multi-plane program operation command 802 corresponding to plane 0 of the LUN0, a read operation command 804 corresponding to plane 1 of the LUN1, and a multi-plane program operation command 806 corresponding to plane 2 of the LUN0. Therefore, the LUN0 and the LUN1 both receive the multi-plane program operation command 802, the read operation command 804, and the multi-plane program operation command 806. With respect to the LUN0, after receiving the multi-plane program operation command 802, an address entry, such as the address entry 602 of FIG. 6, of the LUN0 determines that the multi-plane program operation command 802 includes a command 80$h$ and sends an enabling signal to an address counter, such as the address counter 616, of the LUN0. The address counter of the LUN0 is then enabled and the LUN0 latches program information of plane 0 of LUN0, which includes address data of the multi-plane program operation command 802, into an address register, such as the address register 618, of the LUN0 as discussed above.

In some aspects, the address entry of the LUN0 determines that the multi-plane program operation command 802 also includes a pending multi-plane command, such as a command 11$h$. In such a case, the address entry determines that the LUN0 is in a pending status of a set of multi-plane program operation commands, which includes the multi-plane program operation commands 802 and 806. Subsequently and after receiving the read operation command 804, the address entry refrains from sending the enabling signal to the address counter of the LUN0 based on the pending status of the set of multi-plane program operation commands of the LUN0. Specifically, the address entry can determine that the received read operation command 804 is not a multi-plane program operation command and thus refrains from sending the enabling signal to the address counter of the LUN0. Thus, the address counter of LUN0 remains disabled after receiving the read operation command 804 and the LUN0 refrains from latching address data of the read operation command 804 into the address register of the LUN0. In addition, after receiving the multi-plane program operation command 806, the address entry of the LUN0 latches program information of plane 2 of LUN0, which includes address data of the multi-plane program operation command 806, into the address register of the LUN0. In such a case, the LUN0 ignores the read operation command 804 and the address register stores program information of plane 0 and plane 2 of the LUN0 in the address register. In some aspects, the multi-plane program operation command 806 may include program information of other planes of LUN0. For example, the multi-plane program operation command 806 can include program information of plane 3 or plane 4 of LUN0

Figure 9:
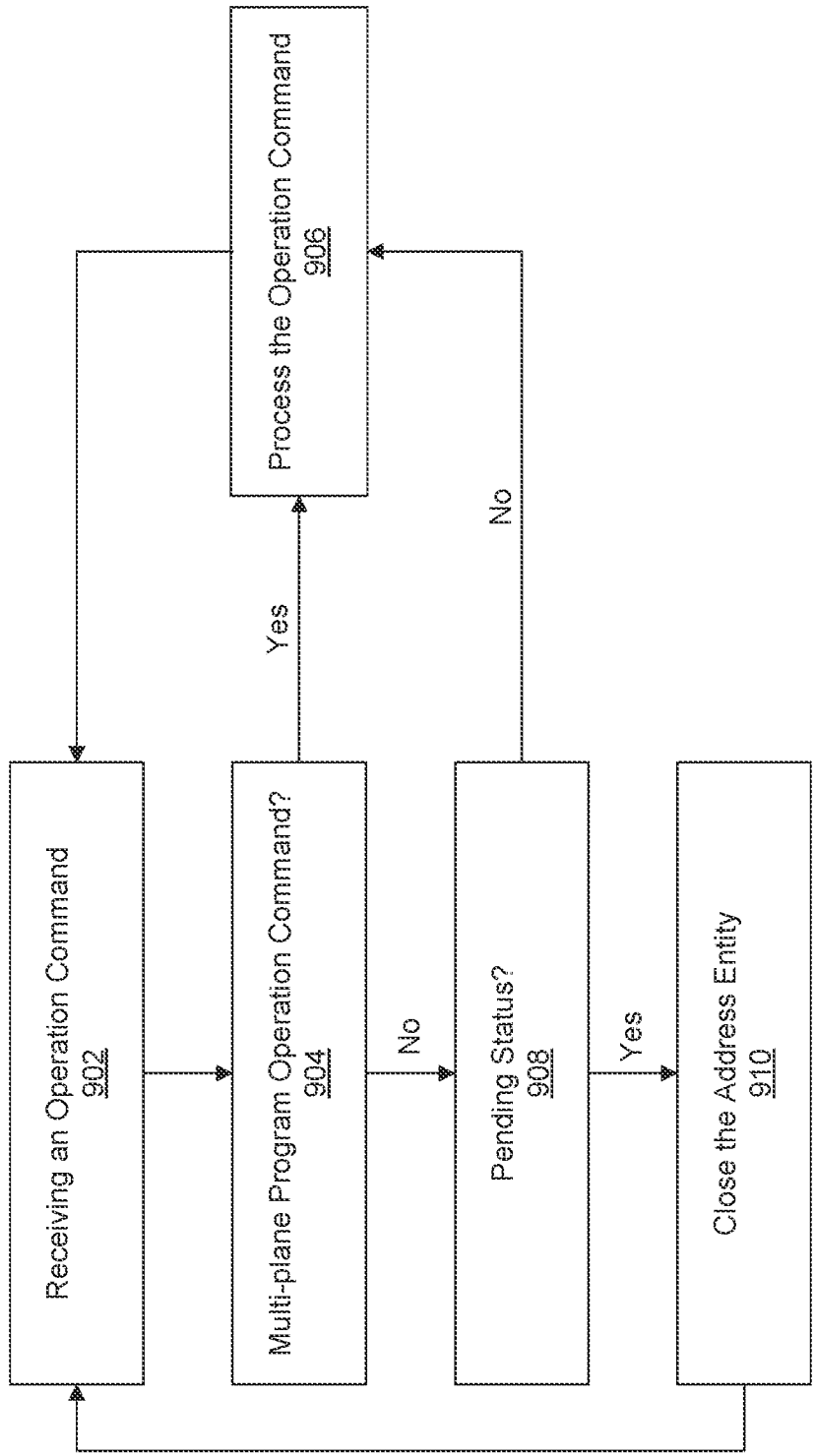
FIG. 9 illustrates an example method of the multi-LUN operations with the address protections, according to aspects of the present disclosure.

FIG. 9 illustrates an example method of the multi-LUN operations with the address protections, according to aspects of the present disclosure. At 902, a LUN, such as the first LUN 302$a$ or the second LUN 302$b$ of the example memory system 300 shown in FIG. 3, receives an operation command. In some aspects, the LUN receives the operation command via a data bus, such as the data bus 306, from a chip controller, such as the chip controller 304, as shown in FIG. 3. The operation command can be a program operation command, a multi-plane program operation command, a read operation command, a block erase operation command, or other operation commands. In some aspects, the operation command can correspond to the LUN or other LUNs. For example, the LUN can be the first LUN 302$a$ of the example memory system 300. The operation command can be a multi-plane program operation command of the first LUN 302$a$ or a read operation command of the second LUN 302$b$. Thus, an address entry of the LUN receives the operation command from the chip controller.

At 904, the address entry determines whether the operation command is a multi-plane program operation command of a set of multi-plane program operation commands. If the address entry determines that the operation command is a multi-plane program operation command of a set of multi-plane program operation commands, the control moves to 906.

At 906, the LUN process the operation command. In some aspects, the address entry sends an enabling signal to an address counter of the LUN and the LUN latches address data of the operation command into an address register of the LUN.

Referring back to 904, if the address entry determines that the operation command is not a multi-plane program operation command of a set of multi-plane program operation commands, the control moves to 908.

At 908, the address entry of the LUN determines whether the LUN is in a pending status of a set of multi-plane program operation commands. In some aspects, if the address entry previously received a multi-plane program operation command that includes a pending multi-plane command, such as a command 11h, and if the address entry has not yet received a multi-plane program operation command that includes a completion multi-plane command, such as a command 10h, the address entry determines that the LUN is in a pending status. In other words, the LUN is in a process of receiving a set of multi-plane program operation commands. In such a case, the control moves to 910.

At 910, the LUN close the address entry. For example, the address entry refrains from sending the enabling signal to the address counter and thus shift registers of the address counter are not enabled. In such a case, the LUN refrains from latching address data of the operation command into the address register based on the statuses of the shift registers of the address counter.

Referring back to 908, on the other hand, if the address entry (1) have not received a multi-plane program operation command; or (2) previously received a multi-plane program operation command that includes a pending multi-plane command, such as a command 11h, and also afterward received a multi-plane program operation command that includes a completion multi-plane command, such as a command 10h, the address entry determines that the LUN is not in the pending status, but in a standby status. In such a case, the control moves to 906 to process the operation command.

In some aspects, at 902, the LUN checks whether the received operation command is directed to the LUN. For example, the LUN can be the first LUN 302a of FIG. 3. The first LUN 302a can check whether the received operation command is directed to the first LUN 302a. If the received operation command is directed to the first LUN 302a, the control moves to 904. Otherwise, the first LUN 302a ignores the received operation command and remains in 902.

In some aspects, at 902, the LUN can proceed to 904 without checking whether the received operation command is directed to the LUN. For example, if the address entry of the LUN previously determined that the LUN is in a pending status as described in 908, the LUN move from 902 to 904 without checking whether the received operation command is directed to the LUN. In some aspects, the LUN in a pending status has received at least one multi-plane program operation command and expects to receive additional multi-plane program operation commands.

Figure 10:
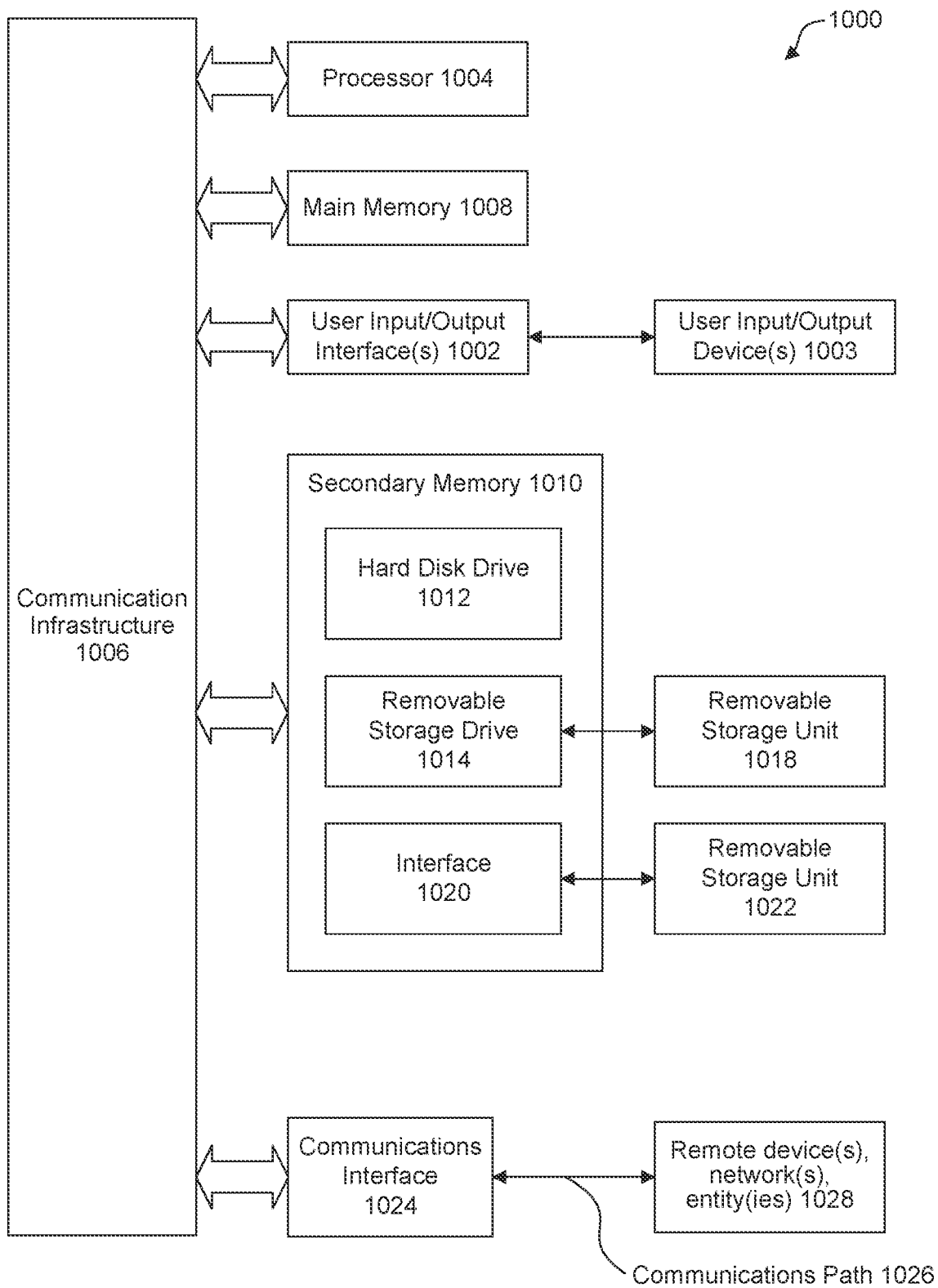
FIG. 10 is an example computer system for implementing some aspects of the disclosure or portion(s) thereof.

Various aspects can be implemented, for example, using one or more systems, such as system 1000 shown in FIG. 10. System 1000 can be any well-known computer capable of performing the functions described herein such as the system 100 of FIG. 1 and the example memory system 300, the first LUN 302a, and the second LUN 302b of FIG. 3. System 1000 includes one or more processors (also called central processing units, or CPUs), such as a processor 1004. Processor 1004 is connected to a communication infrastructure 1006 (e.g., a bus.) System 1000 also includes user input/output device(s) 1003, such as monitors, keyboards, pointing devices, etc., that communicate with communication infrastructure 1006 through user input/output interface(s) 1002. System 1000 also includes a main or primary memory 1008, such as random access memory (RAM). Main memory 1008 can include one or more levels of cache. Main memory 1008 has stored therein control logic (e.g., computer software) and/or data.

System 1000 can also include one or more secondary storage devices or memory 1010. Secondary memory 1010 can include, for example, a hard disk drive 1012 and/or a removable storage device or drive 1014. Removable storage drive 1014 can be a floppy disk drive, a magnetic tape drive, a compact disk drive, an optical storage device, tape backup device, and/or any other storage device/drive.

Removable storage drive 1014 can interact with a removable storage unit 1018. Removable storage unit 1018 includes a computer usable or readable storage device having stored thereon computer software (control logic) and/or data. Removable storage unit 1018 can be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 can include other means, instrumentalities or other approaches for allowing computer programs and/or other instructions and/or data to be accessed by system 1000. Such means, instrumentalities or other approaches can include, for example, a removable storage unit 1022 and an interface 1020. Examples of the removable storage unit 1022 and the interface 1020 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

System 1000 can further include a communication or network interface 1024. Communication interface 1024 enables system 1000 to communicate and interact with any combination of remote devices, remote networks, remote entities, etc. (individually and collectively referenced by reference number 1028). For example, communication interface 1024 can allow system 1000 to communicate with remote devices 1028 over communications path 1026, which can be wired and/or wireless, and which can include any combination of LANs, WANs, the Internet, etc. Control logic and/or data can be transmitted to and from system 1000 via communication path 1026.

The operations in the preceding aspects can be implemented in a wide variety of configurations and architectures. Therefore, some or all of the operations in the preceding aspects can be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, system 1000, main memory 1008, secondary memory 1010 and removable storage units 1018 and 1022, as well as tangible articles of manufacture embodying any combination of the foregoing. Such control logic, when executed by one or more data processing devices (such as system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects can operate with software, hardware, and/or operating system implementations other than those described herein.

Some aspects of this disclosure provide a memory device comprising an address register to store addresses and a processor coupled to the address register. The processor is configured to receive a first multi-plane program operation command of a set of multi-plane program operation commands and latch a first address of the first multi-plane program operation command into the address register. The processor is further configured to receive a read operation command that includes a second address and refrain from latching the second address into the address register.

Some aspects of this disclosure relate to the memory device, wherein the processor is configured to latch the first address into the address register by sending an enabling signal to an address counter of the memory device and latching the first address into the address register based on one or more shift registers of the address counter.

Some aspects of this disclosure relate to the memory device, wherein the sending the enabling signal to the address counter further comprises sending the enabling signal to a first shift register of the address counter in a first cycle and passing the enabling signal from the first register of the address counter to a second shift register of the address counter in a second cycle.

Some aspects of this disclosure relate to the memory device, wherein the processor is configured to refrain from latching the second address into the address register by determining a pending status of the set of multi-plane program operation commands and refrain from sending the enabling signal to the address counter.

Some aspects of this disclosure relate to the memory device, wherein the processor is configured to determine the pending status of the set of multi-plane program operation commands by determining that the first multi-plane program operation command includes a pending multi-plane command.

Some aspects of this disclosure relate to the memory device, wherein the processor is further configured to receive a second multi-plane program operation command of the set of multi-plane program operation commands and determine a standby status of the memory device. The processor is further configured to latch a third address of the second multi-plane program operation command into the address register.

Some aspects of this disclosure relate to the memory device, wherein the processor is configured to determine the standby status of the memory device by determining that the second multi-plane program operation command includes a completion multi-plane command.

Some aspects of this disclosure relate to the memory device, wherein the processor is further configured to receive a second read operation command that includes a fourth address and latch the fourth address into the address register based on determining the standby status of the memory device.

Some aspects of this disclosure provide a memory device comprising a first logic unit (LUN) and a second LUN, wherein the first LUN and the second LUN connect to a data bus. The first LUN is configured to receive, via the data bus, a first multi-plane program operation command of a set of multi-plane program operation commands, wherein the set of multi-plane program operation commands corresponds to the first LUN; latch a first address of the first multi-plane program operation command into a first address register of the first LUN; receive, via the data bus, a read operation command that includes a second address, wherein the read operation command corresponds to the second LUN; and refrain from latching the second address into the first address register. The second LUN is configured to receive, via the data bus, the read operation command and latch the second address into a second address register of the second LUN.

Some aspects of this disclosure relate to the memory device, wherein the first LUN is configured to latch the first address into the first address register by sending an enabling signal to a first address counter of the first LUN and latching the first address into the first address register based on one or more shift registers of the first address counter.

Some aspects of this disclosure relate to the memory device, wherein the sending the enabling signal to the first address counter further comprises sending the enabling signal to a first shift register of the first address counter in a first cycle and passing the enabling signal from the first register of the first address counter to a second shift register of the first address counter in a second cycle.

Some aspects of this disclosure relate to the memory device, wherein the first LUN is configured to refrain from latching the second address into the first address register by determining a pending status of the set of multi-plane program operation commands and refrain from sending the enabling signal to the first address counter.

Some aspects of this disclosure relate to the memory device, wherein the first LUN is configured to determine the pending status of the set of multi-plane program operation commands by determining that the first multi-plane program operation command includes a pending multi-plane command.

Some aspects of this disclosure relate to the memory device, wherein the first LUN is further configured to receive, via the data bus, a second multi-plane program operation command of the set of multi-plane program operation commands; determine a standby status of the first LUN; and latch a third address of the second multi-plane program operation command into the first address register.

Some aspects of this disclosure relate to the memory device, wherein the first LUN is configured to determine the standby status of the first LUN determining that the second multi-plane program operation command includes a completion multi-plan command.

Some aspects of this disclosure relate to the memory device, wherein the first LUN is further configured to receive, via the data bus, a second read operation command that includes a fourth address and latch the fourth address into the first address register based on determining the standby status of the first LUN.

Some aspects of this disclosure provide a memory device comprising an address entry coupled to an address counter and a processor. The address entry is configured to receive a first multi-plane program operation command of a set of multi-plane program operation commands and send an enabling signal to the address counter of the memory device to enable one or more shift register of the address counter. The processor is configured to latch a first address of the first multi-plane program operation command into an address register of the memory device based on one or more shift registers of the address counter. The address entry is further configured to receive a read operation command and refrain from sending the enabling signal to the address counter.

Some aspects of this disclosure relate to the memory device, wherein the sending the enabling signal to the address counter further comprises sending the enabling signal to a first shift register of the address counter in a first cycle and passing the enabling signal from the first register of the address counter to a second shift register of the address counter in a second cycle.

Some aspects of this disclosure relate to the memory device, wherein the latching the first address into the address register based on the one or more shift registers of the address counter further comprises determining that a shift register of the address counter is enabled in a first cycle; determining a portion of the first address that is received in the first cycle; and latching the portion of the first address into a portion of the address register, wherein the portion of the address register corresponds to the shift register.

Some aspects of this disclosure relate to the memory device, wherein the refrain from sending the enabling signal to the address counter further comprises determining that the first multi-plane program operation command includes a pending multi-plane command.

The Summary and Abstract sections can set forth one or more but not all exemplary embodiments of the present disclosure as contemplated by the inventor(s), and thus, are not intended to limit the present disclosure and the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects can perform functional blocks, steps, operations, methods, etc. using orderings different from those described herein.

References herein to "one aspect," "an aspect," "an example aspect," or similar phrases, indicate that the aspect described can include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A memory device comprising:
   an address register configured to store addresses; and
   a processor coupled to the address register and configured to:
   receive a first multi-plane program operation command of a set of multi-plane program operation commands;
   latch a first address of the first multi-plane program operation command into the address register;
   receive a read operation command that includes a second address; and
   refrain from latching the second address into the address register.

2. The memory device of claim 1, wherein the processor is configured to latch the first address into the address register by:
   sending an enabling signal to an address counter of the memory device; and
   latching the first address into the address register based on one or more shift registers of the address counter.

3. The memory device of claim 2, wherein the sending the enabling signal to the address counter further comprises:
   sending the enabling signal to a first shift register of the address counter in a first cycle; and
   passing the enabling signal from the first shift register of the address counter to a second shift register of the address counter in a second cycle.

4. The memory device of claim 1, wherein the processor is configured to refrain from latching the second address into the address register by:
   determining a pending status of the set of multi-plane program operation commands;
   determining that the received read operation command is not a multi-plane program operation command; and
   in response to determining the pending status and determining that the received read operation command is not a multi-plane program operation command, refraining from sending an enabling signal to the address counter.

5. The memory device of claim 4, wherein the processor is configured to determine the pending status of the set of multi-plane program operation commands by:
   determining that the first multi-plane program operation command includes a pending multi-plane command.

6. The memory device of claim 1, wherein the processor is further configured to:
   receive a second multi-plane program operation command of the set of multi-plane program operation commands;
   determine a standby status of the memory device; and
   latch a third address of the second multi-plane program operation command into the address register.

7. The memory device of claim 6, wherein the processor is configured to determine the standby status of the memory device by:
   determining that the second multi-plane program operation command includes a completion multi-plane command.

8. The memory device of claim 6, wherein the processor is further configured to:
   receive a second read operation command that includes a fourth address; and
   latch the fourth address into the address register based on determining the standby status of the memory device.

9. A memory device comprising:
   a first logic unit (LUN) and a second LUN, wherein the first LUN and the second LUN connect to a data bus, and wherein the first LUN is configured to:
   receive, via the data bus, a first multi-plane program operation command of a set of multi-plane program operation commands, wherein the set of multi-plane program operation commands corresponds to the first LUN;
   latch a first address of the first multi-plane program operation command into a first address register of the first LUN;

receive, via the data bus, a read operation command that includes a second address, wherein the read operation command corresponds to the second LUN; and refrain from latching the second address into the first address register; and the second LUN being configured to:
receive, via the data bus, the read operation command; and
latch the second address into a second address register of the second LUN.

10. The memory device of claim 9, wherein the first LUN is configured to latch the first address into the first address register by:
sending an enabling signal to a first address counter of the first LUN; and
latching the first address into the first address register based on one or more shift registers of the first address counter.

11. The memory device of claim 10, wherein the sending the enabling signal to the first address counter further comprises:
sending the enabling signal to a first shift register of the first address counter in a first cycle; and
passing the enabling signal from the first shift register of the first address counter to a second shift register of the first address counter in a second cycle.

12. The memory device of claim 9, wherein the first LUN is configured to refrain from latching the second address into the first address register by:
determining a pending status of the set of multi-plane program operation commands;
determining that the received read operation command is not a multi-plane program operation command; and
in response to determining the pending status and determining that the received read operation command is not a multi-plane program operation command, refraining from sending an enabling signal to the first address counter.

13. The memory device of claim 12, wherein the first LUN is configured to determine the pending status of the set of multi-plane program operation commands by:
determining that the first multi-plane program operation command includes a pending multi-plane command.

14. The memory device of claim 9, wherein the first LUN is further configured to:
receive, via the data bus, a second multi-plane program operation command of the set of multi-plane program operation commands;
determine a standby status of the first LUN; and
latch a third address of the second multi-plane program operation command into the first address register.

15. The memory device of claim 14, wherein the first LUN is further configured to determine the standby status of the first LUN by:
determining that the second multi-plane program operation command includes a completion multi-plan command.

16. The memory device of claim 14, wherein the first LUN is further configured to:
receive, via the data bus, a second read operation command that includes a fourth address; and
latch the fourth address into the first address register based on determining the standby status of the first LUN.

17. A memory device comprising:
an address entry coupled to an address counter of the memory device and configured to:
receive a first multi-plane program operation command of a set of multi-plane program operation commands; and
send an enabling signal to the address counter to enable one or more shift register of the address counter; and
a processor configured to:
latch a first address of the first multi-plane program operation command into an address register of the memory device based on one or more shift registers of the address counter, wherein
the address entry is further configured to:
receive a read operation command; and
refrain from sending the enabling signal to the address counter.

18. The memory device of claim 17, wherein sending the enabling signal to the address counter further comprises:
sending the enabling signal to a first shift register of the address counter in a first cycle; and
passing the enabling signal from the first shift register of the address counter to a second shift register of the address counter in a second cycle.

19. The memory device of claim 17, wherein the latching the first address into the address register based on the one or more shift registers of the address counter further comprises:
determining that a shift register of the address counter is enabled in a first cycle;
determining a portion of the first address that is received in the first cycle; and
latching the portion of the first address into a portion of the address register,
wherein the portion of the address register corresponds to the shift register.

20. The memory device of claim 17, wherein the refraining from sending the enabling signal to the address counter further comprises:
determining that the first multi-plane program operation command includes a pending multi-plane command.

* * * * *